Oct. 11, 1966    J. HELFENSTEIN    3,277,600
FISH HOOK AND LEADER HOLDER
Filed Oct. 2, 1964
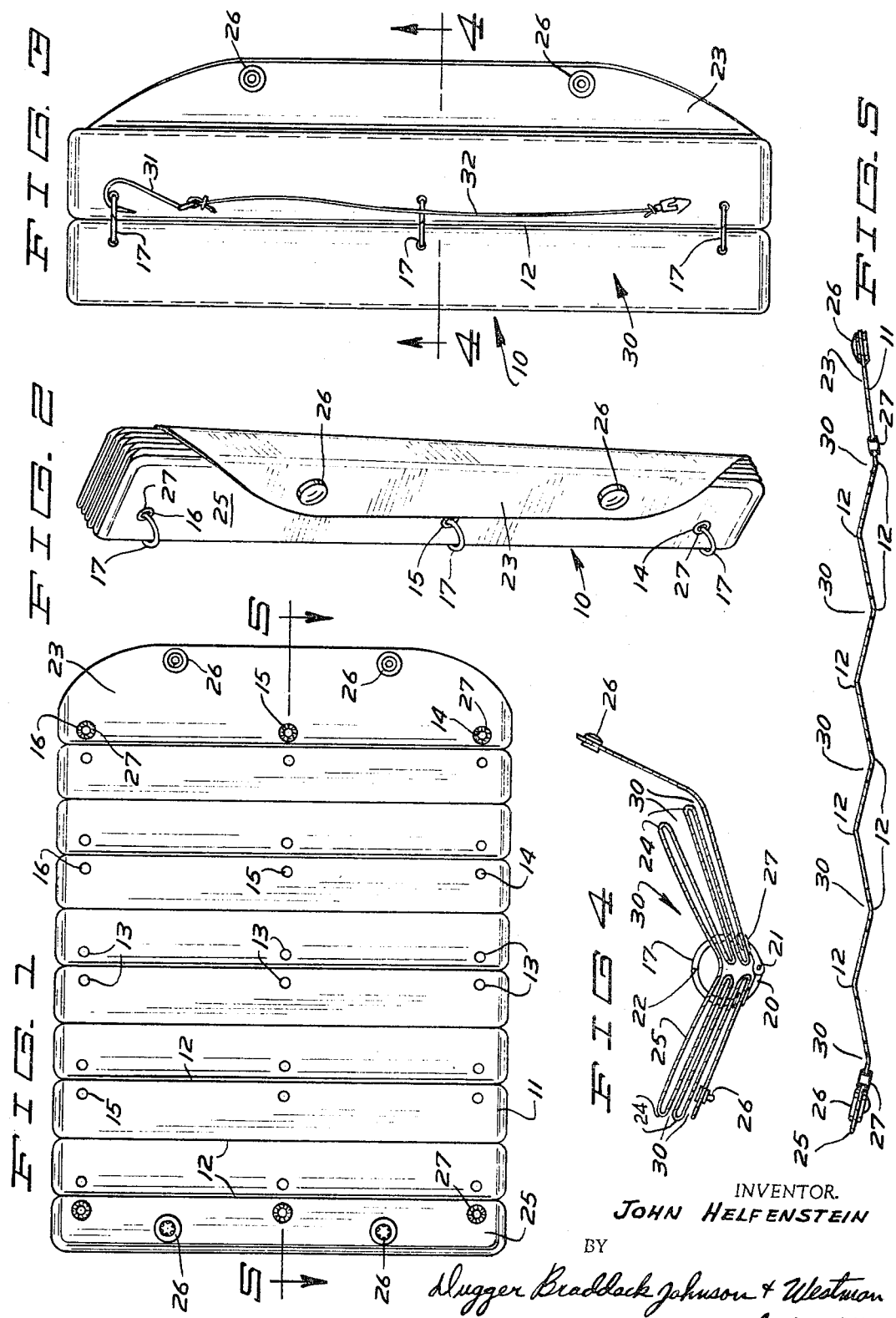
INVENTOR.
JOHN HELFENSTEIN
BY
Dugger Braddock Johnson & Westman
ATTORNEYS

United States Patent Office 3,277,600
Patented Oct. 11, 1966

3,277,600
FISH HOOK AND LEADER HOLDER
John Helfenstein, 3322 Polk St. NE., Minneapolis, Minn.
Filed Oct. 2, 1964, Ser. No. 401,013
4 Claims. (Cl. 43—57.5)

This present invention has relation to a receptacle or holder for storing fish hooks and leaders and more particularly to a multiple compartment fish hook and leader holder which will retain the fish hooks and leaders in neatly held position and has a plurality of pockets to provide for the storage of several different types of fish hooks.

Fisherman always have problems in storage of their tackle. Many fishing tackle boxes are a complete mess and the hooks are intertwined, leaders are snagged and knotted and lines are completely fouled.

This always causes problems and makes a fishing trip much less enjoyable. It can be fairly said that if a fisherman's hooks and leaders are in proper position so that he can instantly check whether or not he has a supply of the desired size or type of hook it will save much wear and tear on the temper. Further, it also is easier on the nerves if the fish hooks that are present are neatly arranged and do not become snagged with other hooks and the leaders do not become tangled and knotted.

The device of the present invention presents a very simply made fish hook and leader holder. The holder is divided into a number of different compartments or divisions so that several different types of fish hooks can be stored in the holder. The holder is of sufficient length so that the leaders attached to the hooks can be laid out full length and held in position so that they will not become entangled with other hooks. The holder has a ring at each end thereof on which the hooks can be engaged to hold them in proper position.

A snap closure is provided so that the holder can be easily opened or closed as desired. Further, the construction is made of a one piece construction employing a plurality of folds so that the manufacture of the device is greatly simplified and the cost is resultingly low.

It is therefore an object of the present invention to present a easily manufactured, low cost, multiple compartment fish hook and leader holder.

In the drawings,

FIG. 1 is a top plan view of a flat layout of a fish hook and leader holder utilized for making the holder of the present invention;

FIG. 2 is a perspective view of a holder after it has been folded and formed from the device of FIG. 1;

FIG. 3 is a plan view of the fish hook and leader holder of FIG. 2 showing one of the compartments in open position and showing a fish hook positioned therein;

FIG. 4 is a sectional view taken as on line 4—4 in FIG. 3, and;

FIG. 5 is a sectional view taken as on line 5—5 in FIG. 1.

Referring to the drawings and the numerals of reference thereon, a fish hook and leader holder illustrated generally at 10 is comprised of a single sheet of material 11, as shown in FIG. 1. The sheet of material 11 is made of a suitable waterproof material, such as a relatively heavy plastic sheet or other similar material. The material must be heavy enough so that it will have some rigidity but still be capable of being creased and bent. Further, waterproofing of the material will prevent it from deteriorating if it should happen to become wet while the fisherman is using it.

As shown, the sheet 11 is provided with a plurality of fold lines 12 spaced along the length of the sheet. The sheet is folded in accordion pleats along the fold lines 12 as perhaps best seen in FIG. 4. The sheet also is provided with a plurality of holes 13 which, when the sheet is folded as shown in FIG. 4, are aligned in three transverse separate rows, namely rows 14, 15 and 16, as can be seen in FIG. 2.

A separate snap type ring book binder 17 is passed through each of the aligned rows of holes 14, 15 and 16, respectively. The binder ring 17 is of conventional design being made up of two sections 20, 20 which are pivotally mounted to each other as at 21 and will interlock as at 22 to hold the ring in closed position. The interlocking structure can be released to separate the ring so that it can be passed over the edge portions of the folded accordion pleated sheets into holes 13. The edge portions of the folds fit within the ring.

An end flap portion 23 of the sheet 11 is of sufficient length so that it will pass over the outer edges of the accordion folds 24 of the folded sheet opposite from the rings 17 and, as shown in FIG. 2, fold over a first side panel 25 on an opposite side from the panel to which the end portion 23 is attached. Suitable snap fasteners 26 are provided on the side panel 25 and the cover flap 23. These snap fasteners can be interlocked to hold the folded sheet in pleated closed position as shown in FIG. 2.

If desired, the holes 13 in the outer panels can have suitable reinforcing members 27 attached thereto to prevent the rings 17 from tearing out of the material.

When the sheet has been folded as shown in FIGS. 2, 3 and 4, the accordion folds along the fold lines 12 form a plurality of open topped, closed bottom receptacles 30. The bottoms of the receptacles are adjacent the rings 17 and the tops are by the cover flap 23. The receptacles 30 are V-shaped as shown, and can be opened into very shallow V shapes as shown in FIG. 3. The fold line 12 in FIG. 3 forms the bottom of the receptacle.

With the holder 10 in position as shown in FIG. 3 a fish hook 31 having a leader 32 attached thereto can be placed over the end ring 17 passing through the row 16 of the holes 13. Leader 32 can be merely laid along the fold line 12 inside the compartment or receptacle 30 and stretched out full length, as shown. A number of hooks 31 and leaders 32 of the same kind can be placed in this receptacle 30 by hooking the hooks 31 over the end ring 17 as shown. When a sufficient supply of hooks have been stored in the receptacle 30 the unit can be closed by folding along the fold line 12 of the receptacle 30 and placing the cover flap over the tops of the receptacles as shown in FIG. 2 and snapping the fasteners 26. The leaders 32 and hooks 31 are then securely held in the holder and cannot fall out.

Further, if desired, several different types of hooks can be stored in the different receptacles 30 of the unit (as shown there are five receptacles in the holder). The holder will maintain the leaders unsnarled and will prevent the fish hooks from being tangled with the leaders attached to other hooks. Further, the hooks can be very quickly removed from the unit merely by opening the holder to the proper receptacle and taking a hook from the end ring 17.

If desired, the end ring 17 on which the hooks are placed can be magnetized to hold the steel hook onto the ring.

It can immediately be seen that this holder can be manufactured merely by accordion pleating a flat sheet and leaving a sufficient amount of material at one side thereof to form the cover flap 23, and then punching through holes 13 in rows 14, 15 and 16. Then, by inserting the ring hook binders 17 and placing suitable snap fasteners on the cover and the one side panel 25, the unit is complete.

The entire holder can be placed into the tackle box without fear of having the hooks becoming entangled in other tackle and the fisherman can immediately and quickly check its supplies of hooks and leaders whenever he sets out on a fishing trip. The hooks and leaders are also readily removed when the fisherman wishes to change to a different type or style of hook.

It should be noted that the rings are large enough so that the compartments are expandable so that each will accommodate a substantial number of fish hooks. The fisherman is not restricted to a limited number of fish hooks in each compartment.

Further the compartments will expand to easily accommodate nightcrawler harnesses, which are difficult to handle. Nightcrawler harnesses have three hooks spaced along a single leader and unless they are kept in a holder will completely foul up a tackle box. The holder of the present invention will prevent them from causing trouble.

What is claimed is:

1. A fish hook and leader holder comprised of a single sheet of foldable, substantially waterproof material, said sheet being folded along a plurality of fold lines to form accordion folds, a plurality of ring type binders passing through the folds adjacent one edge of the accordion folds, said ring type binders being of sufficient size so that the accordion folds can be separated into individual V-shaped compartments with the closed ends of the compartments adjacent the rings, and said ring type binders being of size to protrude into the compartments a sufficient distance to permit the fish hook to be slipped over one ring without damaging the closed edge of the compartment, and end portion of said sheet forming a cover flap adapted to be positioned over the opposite edges of the folds from the ring type binders, and means for releasably fastening said cover flap to the opposite end portion of said sheet.

2. A fish hook and leader holder comprised of a single sheet of foldable substantially waterproof material, said sheet being folded along a plurality of fold lines to form accordion folds, a plurality of ring type binders passing through the folds adjacent one edge of the accordion folds, said ring type binders being of sufficient size so that the accordion folds can be separated into individual V-shaped compartments with the closed ends of the compartments adjacent the rings, and said ring type binders protruding into the compartments a sufficient distance to permit a fish hook to be slipped over one ring without damaging the closed edge of the compartment, a cover member adapted to be positioned over the opposite edges of the folds from the ring type binders, and means for fastening said cover member to the holder, said cover member being comprised as an edge portion of the sheet from which the compartments are made, and at least one of said ring binders being magnetized.

3. The combination as specified in claim 2 wherein the cover flap is of a size to substantially close the open side of said compartments when said flap is fastened.

4. A fish hook and leader holder comprising a single sheet of foldable substantially waterproof material, said sheet being folded along a plurality of fold lines to form accordion folds, a plurality of ring type binders passing through the folds adjacent one edge of the accordion folds, said ring type binders being of sufficient size so that the accordion folds can be separated into individual V-shaped compartments with the closed ends of the compartments adjacent the rings, and said rings protruding into the compartments a sufficient distance to permit a fish hook to be slipped over one ring without damaging the closed edge of the compartment, a cover flap member formed from one edge portion of the sheet and adapted to be folded over the folded portions of the sheet on an opposite side of the ring binder, and means for fastening said cover flap to an outer panel formed from the folded sheet on an opposite side of the compartments, one of said ring type binders being magnetized.

References Cited by the Examiner

UNITED STATES PATENTS

| | | | |
|---|---|---|---|
| 318,891 | 5/1885 | Goodwin | 129—20 |
| 1,076,894 | 10/1913 | Langbein | 43—57.5 |
| 1,454,932 | 5/1923 | Langbein | 43—57.5 |
| 2,537,172 | 1/1951 | Swenson | 283—62 |

SAMUEL KOREN, *Primary Examiner.*

D. J. LEACH, *Assistant Examiner.*